United States Patent
Abel

(10) Patent No.: US 10,697,655 B2
(45) Date of Patent: Jun. 30, 2020

(54) MODULATING MAKEUP FLUID CONTROL SYSTEMS AND METHODS FOR SAME

(71) Applicant: Pure Humidifier Company, Chaska, MN (US)

(72) Inventor: Matthew W. Abel, Crystal, MN (US)

(73) Assignee: PURE HUMIDIFIER COMPANY, Chaska, MN (US)

( * ) Notice: Subject to any disclaimer, the term of this patent is extended or adjusted under 35 U.S.C. 154(b) by 66 days.

(21) Appl. No.: 15/857,011

(22) Filed: Dec. 28, 2017

(65) Prior Publication Data

US 2018/0180310 A1   Jun. 28, 2018

Related U.S. Application Data

(60) Provisional application No. 62/439,686, filed on Dec. 28, 2016.

(51) Int. Cl.

| | |
|---|---|
| *F24F 6/02* | (2006.01) |
| *F24F 11/00* | (2018.01) |
| *H01H 35/18* | (2006.01) |
| *G01F 23/284* | (2006.01) |
| *F24H 9/20* | (2006.01) |
| *F24F 6/00* | (2006.01) |
| *G01F 23/22* | (2006.01) |
| *G01F 23/00* | (2006.01) |

(52) U.S. Cl.
CPC .......... *F24F 6/025* (2013.01); *F24F 11/0008* (2013.01); *F24H 9/2007* (2013.01); *G01F 23/2845* (2013.01); *H01H 35/18* (2013.01); *F24F 2006/008* (2013.01); *G01F 23/0007* (2013.01); *G01F 23/22* (2013.01)

(58) Field of Classification Search
CPC .... G01N 15/02; F24F 3/14; F24F 6/18; B01F 3/04
See application file for complete search history.

(56) References Cited

FOREIGN PATENT DOCUMENTS

CN           106018202 A  * 10/2016   ............. G01N 15/02

OTHER PUBLICATIONS

"Machine Translation of the Detailed Description from CN 106018202 as Provided by Espacenet", (Oct. 12, 2016), 2 pgs.

* cited by examiner

*Primary Examiner* — Robert A Hopkins
(74) *Attorney, Agent, or Firm* — Schwegman Lundberg & Woessner, P.A.

(57) ABSTRACT

A method for maintaining a boiling rate of a base fluid can include a determination of a fluid level of a turbulated base fluid in a reservoir. The fluid level can be determined by measuring at least one first height of the turbulated base fluid above the fluid level with at least a first sensor. The fluid level can be determined by measuring at least one second height of the turbulated base fluid below the fluid level with the first sensor. The method can include the establishment of the fluid level of the turbulated base fluid. The fluid level can be established according to the measured at least one first and second heights. The method can include the graduated introduction of an input fluid into the reservoir. A control valve can gradually introduce the input fluid in proportion to the established fluid level of the turbulated base fluid.

24 Claims, 4 Drawing Sheets

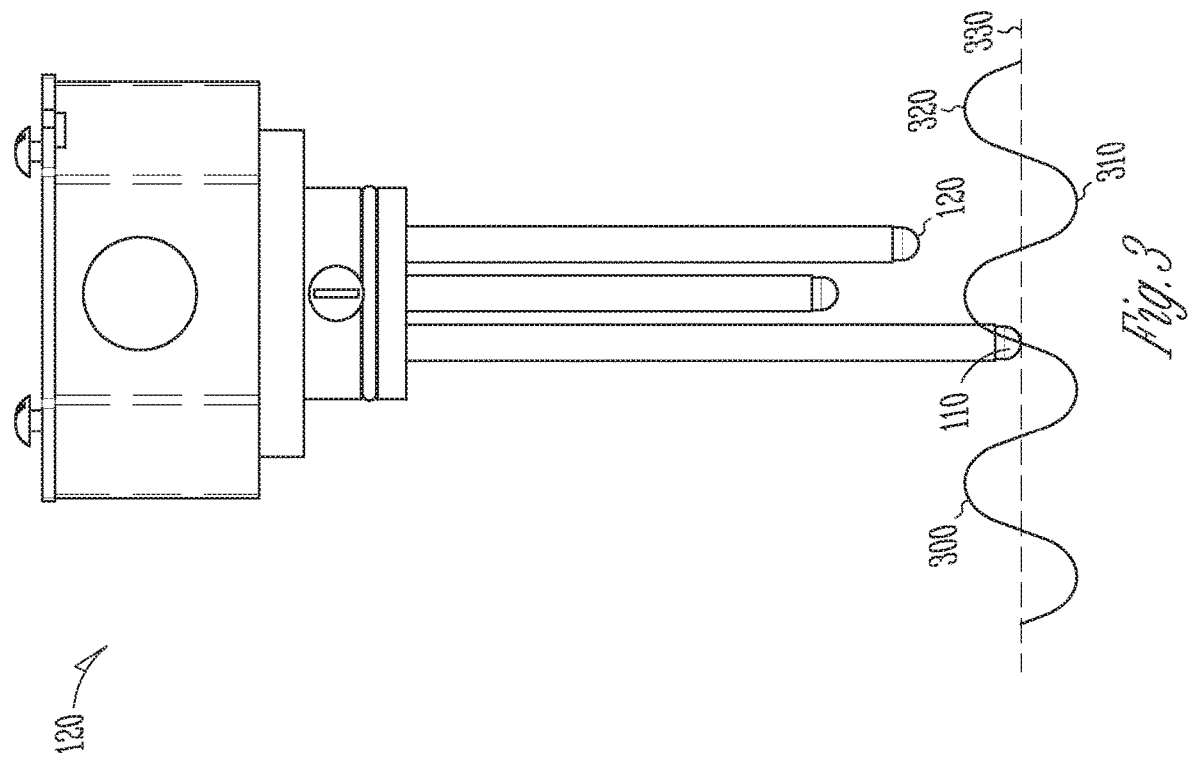
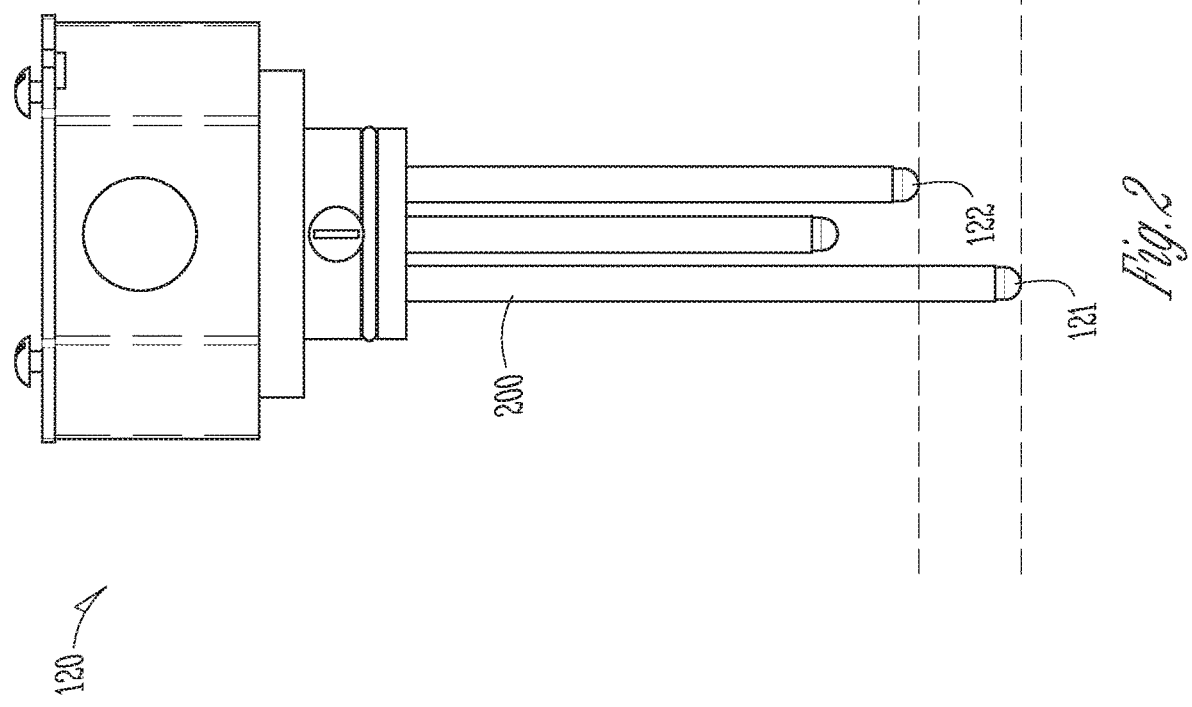

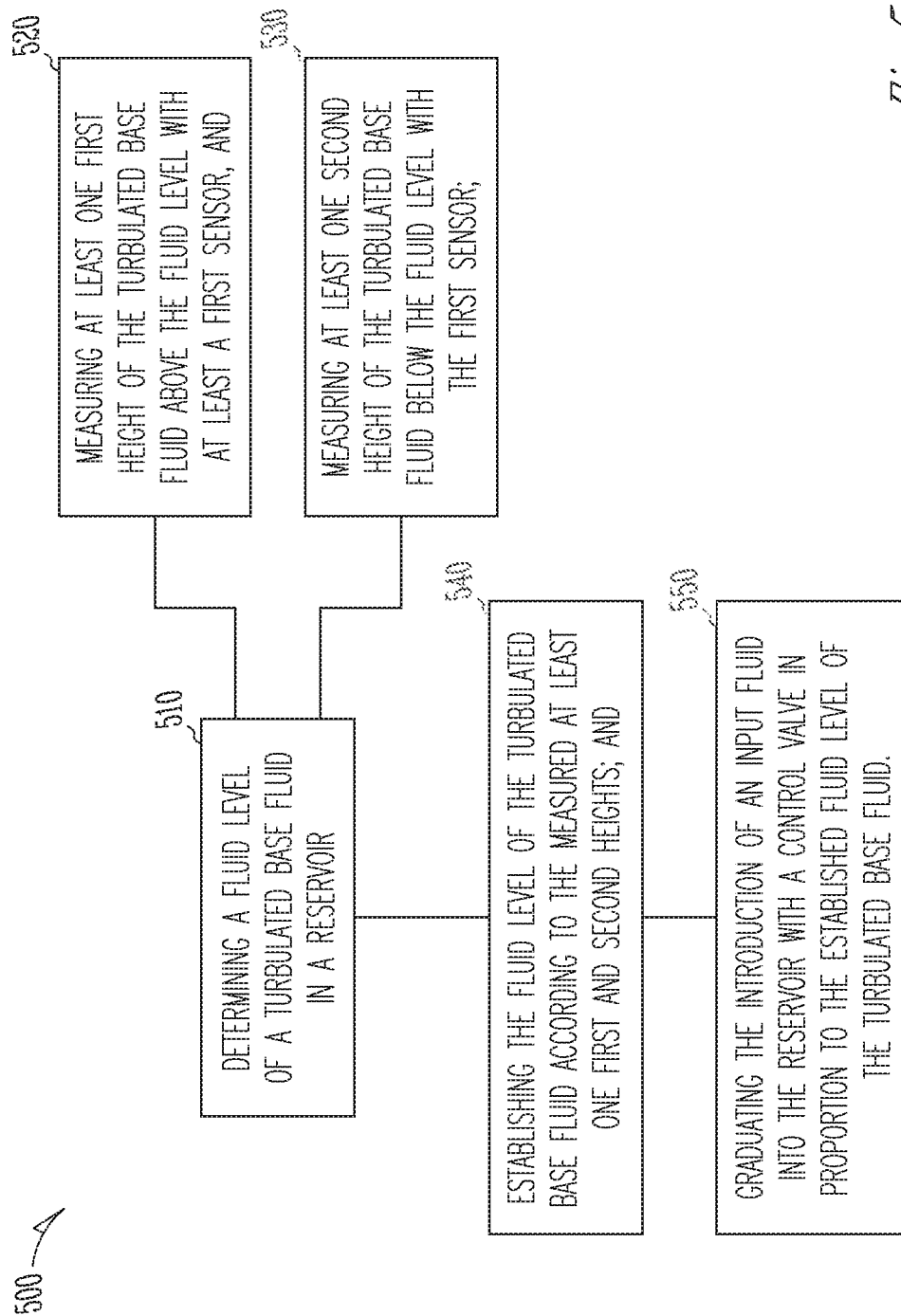

US 10,697,655 B2

MODULATING MAKEUP FLUID CONTROL SYSTEMS AND METHODS FOR SAME

CLAIM OF PRIORITY

This patent application claims the benefit of priority of Abel U.S. Provisional Patent Application Ser. No. 62/439,686 entitled "MODULATING MAKEUP FLUID CONTROL," filed on Dec. 28, 2016 which is hereby incorporated by reference herein in its entirety.

BACKGROUND

A building (e.g., residence, multi-family dwelling, office building, municipal building or the like) will often include heating, ventilating, and air conditioning ("HVAC") appliances to control the atmosphere (e.g., temperature) within the building. In some examples, a humidifier is included with the HVAC appliances to control the amount of humidity present in the atmosphere within the building. An example humidifier includes a tank, a heat source, and a valve for introducing water into the tank. As the heat source heats— and ultimately boils—the water inside of the tank, steam escapes the tank through a steam discharge.

In order to maintain a proper water level within the tank, additional water is added to the tank as steam escapes the tank. Water is added to replace the water that was converted to steam and to ensure continued operation of the humidifier. In some examples, a float valve is used to control the introduction of water into the tank. In another example, a water level sensor is installed within the tank and is configured to sense when the water level rises above the sensor. A controller is in communication with a valve and the water level sensor is used to introduce water into the tank when the water level within the tank reaches a predetermined level (e.g., the water level falls below the water level sensor).

SUMMARY

A problem to be solved includes a diminished boiling rate of a fluid within a reservoir when additional fluid is introduced into the reservoir. In an example where the fluid is water and the reservoir is a tank for a humidifier, a diminished boiling rate of the water within the tank causes a decrease of production of steam within the humidifier tank. In an example where the humidifier discharges steam into an environment (e.g., a room, a building, or the like), a decrease in production of steam within a humidifier tank causes unacceptable variations of humidity within the environment. In some examples, systems fail to maintain the boiling rate of a fluid within a reservoir because the systems lack the capability to precisely measure the fluid level of a turbulated base fluid within the reservoir and gradually introduce more fluid into the reservoir. Existing systems introduce water in an imprecise manner such that the boiling rate of the fluid within the reservoir diminishes to an unacceptable rate.

The aforementioned problems are solved with a system and method for maintaining a boiling rate of a base fluid. A fluid level (e.g., an actual fluid level) of a turbulated base fluid is determined in a reservoir by measuring at least one first height and at least one second height of the turbulated base fluid above and below a first sensor, respectively. In an example, the first height is above the fluid level and the second height is below the fluid level. The fluid level of the turbulated base fluid is established according to the measured at least one first and second heights. Establishing the fluid level with the at least one first height and at least one second height improves the accuracy of the determination of the water level. Additionally, measuring in this manner more precisely determines the fluid level because the fluid level is determined within a range of levels as opposed to existing systems that determine the fluid level at discrete points. Stated another way, measuring in this manner allows for greater resolution of fluid levels as compared to existing systems. Further, measuring in this manner improves the accuracy and precision of water level determinations as compared to a floating level sensor because the floating level sensor, in operation, provides an inconsistent water level because the base fluid is moving (e.g., turbulated).

Additionally, the method also includes, in at least some examples, graduating the introduction of an input fluid into the reservoir with a control valve. The control valve introduces the input fluid in a graduated manner in proportion to the consistently accurate and reliably established fluid level of the turbulated base fluid. Graduating the introduction of an input fluid into the reservoir based on the accurate and high resolution determination of the liquid level maintains the boiling rate of a base fluid because the input fluid is added in a moderated manner, instead of being introduced in large quantities when a float or level sensor is triggered. The boiling rate is maintained because the input fluid, at a temperature below the boiling temperature of the base fluid, is introduced in a measured manner that does not decrease the temperature of the base fluid below the boiling temperature of the base fluid.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 is a side view of one example of a sensor array.

FIG. 3 is a side view of the sensor array of FIG. 2 and a turbulated base fluid.

FIG. 5 is a block diagram showing one example of a method for maintaining a boiling rate of a base fluid.

DETAILED DESCRIPTION

Figure 1:
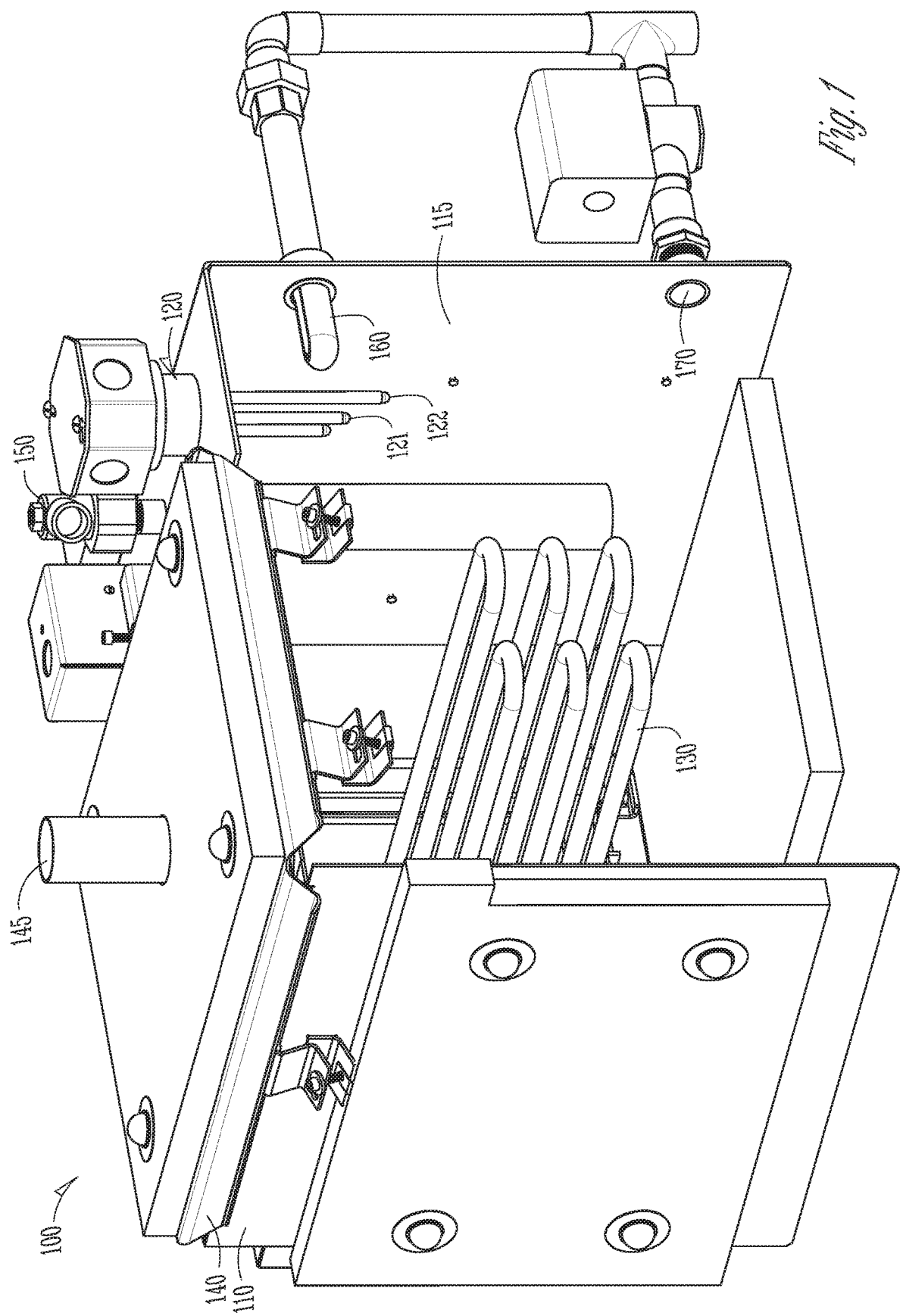
FIG. 1 is a cross sectional view of one example of a system for producing vapor.

FIG. 1 is a cross sectional view of one example of a system 100 for producing vapor. In some examples, the system 100 includes a humidifier, a boiler, or the like. The system 100 shown in FIG. 1 includes a tank 110 defining a reservoir 115. The reservoir 115 is configured to contain a base fluid. In one example, the base fluid includes water (e.g., tap water, deionized water, distilled water, or the like). In some instances, the base fluid is turbulated inside the reservoir 115. In an example, the turbulated base fluid is a fluid having a turbulent, agitated or undulating surface. As described herein, the base fluid is optionally driven my mechanical, fluid or thermodynamic mechanisms into the turbulated configuration. Optionally, the base fluid is turbulated with one or more fluid or thermodynamic processes that precipitate boiling including, but not limited to, heating of the fluid such as water, decreasing ambient pressure in the reservoir to trigger boiling or the like.

Referring again to FIG. 1, in one example, the system 100 includes one or more heaters 130 (e.g., resistive heating elements, boiler tubes or the like). The one or more heaters 130 are configured to supply thermal energy to the base fluid contained within the reservoir 115. In some examples, the system 100 includes a heat exchanger configured to supply thermal energy to the base fluid contained within the reservoir 115. For instance, in one example, the heat exchanger is positioned in the reservoir 115 and is in communication with the base fluid contained within the reservoir 115. Additionally, the heat exchanger is in communication with a heat source (e.g., a boiler, natural gas burner, geo-thermal source, or the like) that supplies thermal energy to a fluid that flows through the heat exchanger, thereby heating the base fluid contained within the reservoir 115. The one or more heaters 130, heat exchanger or the like are optionally configured to turbulate the base fluid through initiation and maintenance of boiling.

In some instances, the system 100 includes a cover 140 coupled with the tank 110. The system 100 includes a discharge 145 in communication with the reservoir 115. In some examples, the cover 140 includes the discharge 145 communication with the reservoir 115. The discharge 145 is the outlet for the base fluid from the reservoir 115. As described herein, in an example the turbulated base fluid is boiling water. The boiling water in the reservoir 115 produces steam and the steam flows from the reservoir 115 through the discharge 145. Optionally, the reservoir 115 is sealed (with the exception of the discharge 145) to prevent the base fluid from otherwise escaping from the reservoir 115. Further, sealing the reservoir 115 facilitates the maintenance of specified pressures, temperatures and the like.

The system 100 includes one or more sensors. In an example, the one or more sensors are included in a sensor array 120. As shown in the example provided in FIG. 1 the sensor array 120 includes a first sensor 121 and a second sensor 122. In some instances, the sensor array 120 includes one or more sensors (e.g., one, two, or three or more sensors). As discussed herein, the one or more sensors are configured to monitor a base fluid level (e.g., an actual amount, the volume of, the quantity of, or the like) in the reservoir 115.

In another example, the system 100 includes a control valve 150, such as a modulating control valve. The modulating control valve 150 introduces (e.g., permits flow, inputs, directs, deposits, provides, or the like) an input fluid, such as water, into the reservoir 115. The modulating control valve 150 is in communication with an input fluid source (e.g., municipal water system, deionized water source, or the like). In some examples, the modulating control valve 150 is configured to provide a variety of orifice sizes, opening sizes or the like to control a flow rate of the input fluid into the reservoir 115. For instance, the modulating control valve provides one or more flow rates of the input fluid, including a range of flow rates, to the reservoir 115 based on a specified flow rate (e.g., determined with the sensor array 120, as described herein).

In some examples, the system 100 includes an overflow 160. The overflow 160 includes an opening in communication with the reservoir 115. The overflow 160 is configured to prevent the base fluid level within the reservoir 115 from exceeding a specified level, thereby preventing the reservoir 115 from overfilling with the base fluid. In another example, the system 100 includes a drain 170 configured to substantially empty the reservoir 115 of the base fluid (e.g., for maintenance, transport or the like).

FIG. 2 is a side view of one example of a sensor array 120. As discussed herein, the one or more sensors are configured to monitor the base fluid level in the reservoir 115 (shown in FIG. 1). In some examples, the one or more sensors include on/off float switches configured to monitor the base fluid level in the reservoir 115 (shown in FIG. 1). In some instances, the one or more sensors include electrical characteristic instruments, such as an impedance sensor. In an example, the electrical characteristic instruments measure the impedance (e.g., resistance, conductivity, capacitance, inductance or the like) of the base fluid to monitor the base fluid level in the reservoir 115. In one example, the impedance sensor measures the capacitance or inductance of deionized water to monitor the base fluid level in the reservoir 115.

In another example, the one or more sensors includes a conductance probe 200. In the examples shown in FIGS. 1, 2, and 3; a plurality of conductance probes are used. In an example, the conductance probe 200 is sheathed in an electrically insulative material and a tip of the conductance probe 200 is exposed (e.g., sheathing is removed). The exposed tip of the probe 200 provides one or more of the first or second sensors 121, 122. In an example, the first sensor 121 is in communication with base fluid, such as water, contained in the reservoir 115. An electrical signal is transmitted to the first sensor 121. The water contains impurities that allow the electrical signal to be transmitted from the first sensor 121, through the water, and to the tank 110 (shown in FIG. 1). In some examples, the electrical signal is used, such as by determining the resistance between the first sensor 121 and the tank 110 (shown in FIG. 1), to determine (e.g., monitor) that the water level within the reservoir 115 is at a specified level (e.g., low level, normal operating level or a full level).

In an example, the system 100 (shown in FIG. 1) uses existing components in a discrete fluid level control system including one or more sensors configured to detect a turbulated base fluid at one or more levels (e.g., heights, depths or the like) in the reservoir. In some examples, a fluid level sensor (e.g., the first sensor 121 or the second sensor 122) determines that the fluid level is at or above a particular height corresponding to the position of the sensor element. Stated another way, a fluid level sensor detects the fluid at two positions: at or above the fluid level sensor (e.g., in communication with the sensor), and below the fluid level sensor (e.g., not in communication with the sensor).

In some examples, the reservoir is a humidifier water tank. Boiling of a fluid (e.g., used to generate vapor for introduction to a stream of gas) creates turbulence in the fluid (e.g., waves, ripples, bubbles, or the like). With turbulence in the fluid, other devices used to measure discrete fluid levels sense periodic on and off conditions that frustrate the accurate measurement of the fluid level. In some examples, the turbulence in the base fluid is created by a mechanical device (e.g., a paddle, a pump, a oscillating or reciprocating mechanism, or the like) alone or in combination with a thermodynamic based turbulation, such as boiling. In an example where the turbulent state of the base fluid (e.g., water) results in a series of undulations (e.g., waves, bubbling surface or the like) on the surface of the base fluid, the height of the undulations vary depending on one or more of the boiling rate, mechanical turbulation or the like of the base fluid.

In the example of the discrete fluid level control systems described herein, turbulation of the fluid is used advantageously to accurately and precisely establish the fluid level (e.g., quantity, height, volume or the like) under dynamic conditions including evaporation, in flow, out flow, turbulation, boiling, or the like. More accurate and precise determination of the fluid level is achieved by sensing the fluid level over a period of time and under dynamic conditions. Stated another way, the fluid level of the turbulated base fluid is established according to the measured at least one first and second levels sensed by the fluid level sensor (e.g., the first sensor 121).

Referring again to FIG. 2, in an example where the sensor array 120 includes the first sensor 121 and the second sensor 122. The first sensor 121 is located at a first sensor location, such as a first elevation. The second sensor 122 is located at a second sensor location, such as a second (higher) elevation. In an example, the second sensor location is different from the first sensor location. For instance, the first sensor 121 differs in length with respect to the second sensor 122. The fluid level sensor array 120 discerns that the base fluid level is in one of three regions (e.g., at one or more levels, heights, depths or the like). In the example provided below, the three regions include (but are not limited to) a first region 210, a second region 220, and a third region 230. In the first region 210 none of the probes (e.g., including the lowest elevation first sensor 121) sense the base fluid (e.g., water). In some examples, the first region 210 is assigned a numerical value of 0 for fluid level indexing purposes. The second region 220 corresponds to one probe (e.g., the first sensor 121) detecting the base fluid. In some examples, the second region 220 is assigned a numerical value of 1 for fluid level indexing. The third region 230 corresponds to two probes (e.g., the first sensor 121 and the second sensor 122) detecting the base fluid. In some examples, the third region 230 is assigned a numerical value of 2 for fluid indexing purposes.

As described herein, in an example, the base fluid in the reservoir 115 (shown in FIG. 1) is turbulated. The level of the turbulated base fluid is measured to determine if additional fluid (e.g, the input fluid described with reference to FIG. 1) is specified for input to the reservoir 115. In some instances, measuring the level of the turbulated base fluid includes measuring a first level and a second level of the turbulated base fluid (e.g., a peak and trough of the turbulated fluid). In an example, measuring the first height and the second height of the turbulated base fluid includes sensing the turbulated base fluid is in the first region 210 (e.g., below the first sensor 121). In another example, measuring the first height and the second height of the turbulated base fluid includes sensing the turbulated base fluid is in the second region 220 (e.g., between the first sensor 121 and the second sensor 122, or above the first sensor 121 and below the second sensor 122). In yet another example, measuring the first height and the second height of the turbulated base fluid includes sensing the turbulated base fluid is in the third region 230 (e.g., at or above the second sensor 122).

FIG. 3 is a side view of the sensor array 120 of FIG. 2 and a turbulated base fluid 300. An undulation of the turbulated base fluid has a wave midpoint 330 (e.g., a wave centerline) between the peak 320 and trough 310 of the wave. In some instances, the wave midpoint 330 corresponds to the base fluid level within the reservoir 115. In an example where the wave midpoint 330 is located at the lower probe (e.g., the first sensor 110), the fluid level is determined by detecting the turbulated base fluid at one or more heights in the reservoir 115 (shown in FIG. 1) several times per second over the course of a time period (e.g., a sampling period, duty cycle or the like such as every 5, 10, 15, 20 seconds, a minute or the like).

As described herein, in some instances, the first region 210 (shown in FIG. 2) is assigned a numerical value of 0 for fluid level indexing. Similarly, the second region 220 and the third region 230 are assigned a numerical value of 1 and 2, respectively. With the wave midpoint 330 coincident with the first sensor 110, the numerical values generated from the first sensor 110 result in a roughly 50:50 ratio of sensing a numerical value of "1" (e.g., the first height) and sensing a numerical value of "0" (e.g., the second height). The average of those readings is approximately "0.5". In another example, if the wave midpoint 330 height is not at the height of the first sensor 110 (is above or even below the first sensor 121 because of contact by the wave crests) the numerical values range from 0 to 1 with a corresponding varying ratio. In yet another example, if the wave midpoint 330 height is proximate the height of the second sensor 120, the numerical values range from 0-2 (or 1-2 depending on the amplitude of the undulations) because at least the peak of the base fluid contacts the second sensor 120.

In an example, the quantity of numerical values are equal to the number of readings that were taken in a sample period. For instance, if 20 samples are measured over a sample period of one second, data generated (numerical values as described above) are in increments of 1/20 seconds or 0.05 seconds. By increasing the sampling rate of the fluid sensor, the system 100 provides greater resolution and corresponding higher precision and accuracy of the fluid level determination.

As described herein, in some examples, the first height and the second height of the turbulated base fluid is measured by the sensor array 120. In an example, measuring the first height or the second height of the turbulated base fluid includes measuring a first time period the turbulated base fluid is above the first sensor 121 during a sample period. Additionally, measuring the first height or the second height of the turbulated base fluid also includes measuring a second time period the turbulated base fluid is below the second sensor 121 during the sample period. Further, measuring the first height or the second height of the turbulated base fluid also includes establishing one or more of the first height or the second height according to the measured first time period and second time period. In this example, the measuring of the first height or the second height is accomplished similarly to the aforementioned examples. However, in addition to establishing whether or not the fluid is in a region (e.g., the first region 210, the second region 220, or the third region 230), the apparatus evaluates the length of time that the fluid is within a particular region. Stated another way, the apparatus establishes the fluid level of a turbulated base fluid by determining the length of time the turbulated base fluid is sensed (and not sensed) by a fluid level sensor (e.g., the first sensor 121).

In contrast to a system that measures discrete values (e.g., 0, 1, 2, or the like) with an ordinary sampling scheme, the system 100 is able to measure more precise and accurate values (e.g., 0.05, 0.45, 1.35, or the like). For example, if 100 readings were conducted over a sample period and 35 of those readings produced a numerical value of 2, and 65 of those readings produced a numerical value of 1, the average value of those readings is 1.35. In other words, the wave midpoint 330 of the turbulated base fluid is 35 percent between the first sensor 110 and the second sensor 120. In an example, the first sensor 110 is spaced ten inches from a bottom of the tank 110 (shown in FIG. 1). The second sensor 120 is spaced from the first sensor 110 by one inch (e.g., the second sensor is eleven inches from the bottom of the tank 110). The reading of 1.35 signifies that the wave midpoint 330 is located at 10.35 inches from the bottom of the tank 110.

The ability of the system 10 to measure more precise and accurate values contrasts with a discrete system that is only capable of sensing water at specific levels and performing operations as a result. For example, a discrete system will sense that the second sensor 122 is not in communication with a base fluid. In response, the system will operate a fill valve (e.g., the control valve 150 shown in FIG. 1) until the base fluid is in communication with the second sensor 122. Once the base fluid is in communication with the second sensor 122, the system will cease operation of the fill valve (e.g., stop the introduction of the base fluid into the reservoir 115). The present subject matter is capable of establishing that the fluid level is at a non-discrete value (e.g., 1.35) and then metering the introduction of an input fluid such that the fluid level rises to the specified level (e.g., a numerical value of 2, or coincident with the second sensor 120).

Other operations are possible to be performed on the range of numerical values collected during the sample period. For example, the numerical values are inputs into a mathematical model that determines the fluid level. In other examples, the numerical values are inputs into proportion, integration, or derivative ("PID") loop (or a combination thereof). The PID loop periodically determines an error value that is the difference between a process set point (e.g., the desired humidity in an environment or desired fluid level within a reservoir) and a process variable (e.g., the actual humidity in an environment or actual fluid level within a reservoir). The PID loop parameters are optimized to best minimize the error value. The resultant value computed by the PID loop is used to adjust a control variable. In one example, the control variable is an input signal into a control valve. In some examples, and as will be discussed further herein, the range of numerical values collected during the sample period are used to create a turbulent surface parameter.

As described herein, in some examples, the first height and the second height of the turbulated base fluid is measured by the sensor array 120. In yet another example, the measuring of the first height or the second height is established according to a proportion of the measured first time period to the second time period. Stated another way, the first or second height of the turbulated base fluid is determined by evaluating the amount of time that the fluid is within a particular region in comparison to the time that the fluid is within another region. The result of the comparison establishes the fluid level within the reservoir 115 (shown in FIG. 1). For example, and as shown in FIG. 3, the first sensor 121 dynamically and automatically measures the height of the fluid level based on the wave form of the turbulated base fluid. In this example, the first sensor 121 detects the fluid (e.g., the wave is at or above the first sensor 121) around 50 percent of the period (e.g., of the wave, time interval, or the like) and accordingly does not detect the fluid the remaining 50 percent of the period (the fluid is below the sensor element). Based on the 50/50 proportion of the sensed heights and the location of the sensor element the system determines the fluid level (in this example) is accurately and precisely located at the fluid level shown in dashed lines. In other examples where the proportion changes (e.g., 70 at or above and 30 below) fluid level is established at a corresponding proportional location above the first sensor. In still yet another example, the aforementioned examples for measuring the first or second height are performed repeatedly on an ongoing basis, and the output (determined height) is automatically updated based on the continued measurements.

Figure 4:
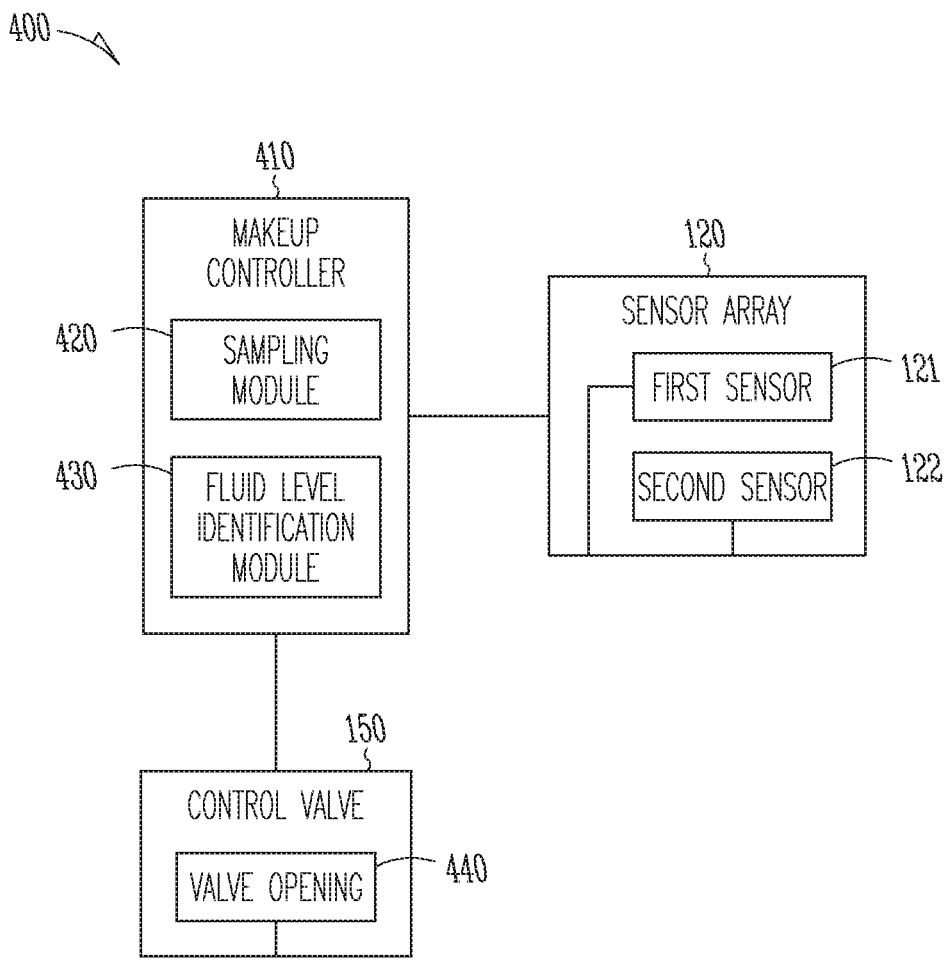
FIG. 4 is a schematic view showing one example of a fluid level measuring apparatus.

FIG. 4 is a schematic view showing one example of a fluid level measuring apparatus 400. In describing the fluid level measuring apparatus 400, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described with respect to the fluid level measuring apparatus 400 include, but are not limited to, the corresponding numbered elements provided herein and other corresponding elements described herein (both numbered and unnumbered) as well as their equivalents.

In some examples, the fluid level measuring apparatus 400 includes a makeup controller 410. In one example, the makeup controller 410 includes a sampling module 420. In some instances, the sampling module 420 is in electrical communication with the fluid level sensor array 120 and is configured to receive one or more measurements (e.g., values) of the fluid level from the fluid level sensor array 120. In another example, the makeup controller 410 includes a fluid level identification module 430. In some instances, the fluid level identification module 430 is configured to determine a turbulent fluid surface parameter, based on the one or more measurements of the fluid level (e.g., within the reservoir 115 shown in FIG. 1). In yet another example, the turbulent fluid surface parameter corresponds to the amount of the base fluid (e.g., volume) contained in the reservoir 115.

Referring again to FIG. 4, in an example, the range of values (e.g., of the turbulent surface parameter) is used as an input to the makeup controller 410 in a manner similar to the use of an analog temperature measurement that is used to control a modulated heating process. In one example, the apparatus 400 includes the control valve 150. The control valve 150 is coupled to the reservoir 115 (shown in FIG. 1) for the metered (e.g., graduated) introduction of an input fluid (e.g., water) into the reservoir 115. In another example, the control valve 150 has a valve opening 440, wherein the valve opening is configured to be opened and closed. In yet another example, the valve opening 440 is configured to regulate flow through the control valve 150 between flow rates including no flow, full flow and one or more moderated flow rates therebetween. In still yet another example, the control valve 150 is configured to control a flow rate of an input fluid through the valve by opening and closing the valve opening 440 in a graduated manner. In some examples, the control valve 150 is in communication with the makeup controller 410.

In an example, the makeup controller 410 is in communication with the fluid level sensor array 120 and the makeup controller 410 is responsible for determining the fluid level within the reservoir 115 (shown in FIG. 1). In another example, the makeup controller 410 is configured to control the flow rate of the input fluid through the control valve 150 by communicating with the control valve 150. In some examples, the controlling of the flow rate is proportional to the turbulent fluid surface parameter determined by the makeup controller 410. In some instances, graduating the introduction of the input fluid into the reservoir 115 includes the makeup controller 410 automatically controlling the valve opening 440 and corresponding flow rates through the valve opening 440 according to the established fluid level of the turbulated base fluid. In yet another example, the flow rate is controlled by the makeup controller 410 providing an input to the control valve 150 that controls the valve opening 440 and regulates the flow rate through the control valve 150 (based on the established fluid level). In one example, the makeup controller 410 is a programmable logic controller ("PLC"). In another example, the makeup controller 410 includes a microprocessor.

In still yet another example, graduating the introduction of an input fluid into the reservoir 115 (shown in FIG. 1) includes dynamically operating the control valve 150 at full flow for a specified amount of time, with the specified amount of time in proportion to the determined base fluid level. Stated another way, the introduction of the input fluid into the reservoir 115, in this example, is graduated by operating the control valve 150 at a full flow rate for an amount of time corresponding to a specified base fluid level of the base fluid. In an example, if the discrepancy between the specified base fluid level and the actual base fluid level is small, the control valve 150 is operated for a relatively small period of time. In another example, if the discrepancy between the specified base fluid level and the actual base fluid level is relatively large compared to the previous small difference (e.g., because of increased steam needs) the control valve 150 is operated for a longer time period to quickly achieve the fluid level to the specified base fluid level.

The precise and accurate determination of the fluid level allows for precise and accurate controlled metering of the input fluid into the reservoir 115 (shown in FIG. 1). The precise metering of the fluid avoids large inputs of the input fluid at a single time and instead allows a graduated input of the input fluid. The graduated input of the input fluid facilitates the maintenance of evaporation/boil and allows the humidifier, boiler, etc. to maintain the specified output (e.g., steam, vapor for humidification or the like).

FIG. 5 is a block diagram showing one example of a method 500 for maintaining a boiling rate of a base fluid. In some instances, the method 500 includes the system 100, the fluid level sensor array 120, and/or the fluid level measuring apparatus 400. In describing the method 500, reference is made to one or more components, features, functions and steps previously described herein. Where convenient, reference is made to the components, features, steps and the like with reference numerals. The reference numerals provided are exemplary and are not exclusive. For instance, components, features, functions, steps and the like described in the method 500 include, but are not limited to, the corresponding numbered elements provided herein and other corresponding elements described herein (both numbered and unnumbered) as well as their equivalents.

At 510, a fluid level of a turbulated base fluid in a reservoir is determined. In one example, at 520, the fluid level is determined by measuring at least one first height of the turbulated base fluid above the fluid level with at least a first sensor. In another example, at 530, the fluid level is determined by measuring at least one second height of the turbulated base fluid below the fluid level with the first sensor. In some instances, the measuring of the first height or the second height includes sensing the turbulated base fluid is above the first sensor. In an example, the measuring of the first height or the second height includes sensing the turbulated base fluid is below the first sensor. In yet another example, the measuring of the first height or the second height includes establishing one or more of the first height or the second height according to the sensed turbulated base fluid above and below the first sensor.

In some examples, measuring the first height or the second height of the turbulated base fluid includes measuring a first time period the turbulated base fluid is above the first sensor during a sample period. In another example, measuring the first height or the second height of the turbulated base fluid includes measuring a second time period the turbulated base fluid is below the second sensor during the sample period. In yet another example, measuring the first height or the second height of the turbulated base fluid includes establishing one or more of the first height or the second height according to the measured first and second time periods. In some instances, establishing one or more of the first height or the second height according to the measured first and second time periods includes establishing one or more of the first height or the second height according to a proportion of the measured first time period to the second time period.

As described herein, in some instances, the first sensor is included in a sensor array. In a further example, measuring the first height and the second height of the turbulated base fluid includes sensing the turbulated base fluid is above the first sensor of a sensor array. In some examples, measuring the first height and the second height of the turbulated base fluid includes sensing the turbulated base fluid is between the first sensor and a second sensor of the sensor array. In some instances, measuring the first height and the second height of the turbulated base fluid includes sensing the turbulated base fluid is below the second sensor.

In an example, measuring the first height and second height of the turbulated base fluid includes measuring a first time period the turbulated base fluid is above the first sensor during a sample period. In another example, measuring the first height and second height of the turbulated base fluid includes measuring a second time period the turbulated base fluid is between the first and second sensors during the sample period. In yet another example, measuring the first height and second height of the turbulated base fluid includes measuring a third time period the turbulated base fluid is below the second sensor during the sample period.

At 540, the method 500 includes establishing the fluid level of the turbulated base fluid according to the measured at least one first and second heights. In an example, establishing the fluid level includes establishing the fluid level according to the sensed turbulated base fluid above, between and below the first and second sensors, respectively. In another example, establishing the fluid level includes establishing the fluid level according to the measured first, second and third time periods.

At 550, the method 500 includes graduating the introduction of an input fluid into the reservoir with a control valve in proportion to the established fluid level of the turbulated base fluid. In some examples, the control valve includes a valve opening configured to regulate flow between flow rates including no flow, full flow and one or more flow rates therebetween. In one example, graduating the introduction of the input fluid into the reservoir includes automatically controlling the valve opening between the flow rates according to the established fluid level of the turbulated base fluid. In another example, graduating the introduction of the input fluid into the reservoir includes dynamically operating the control valve at full flow for a specified amount of time, with the specified amount of time in proportion to the determined fluid level.

Several options for the method 500 follow. In one example, the method 500 includes repeating the establishing of the fluid level of the turbulated base fluid on an ongoing basis. In another example, graduating the introduction of the input fluid includes proportionally opening the control valve according to the repeated establishing of the fluid level. In yet another example, the method 500 includes turbulating the base fluid. In an example, turbulating the base fluid includes bringing the base fluid to a boil. In another example, turbulating the base fluid includes mechanically turbulating the base fluid.

VARIOUS NOTES & EXAMPLES

Aspect 1 may include or use subject matter (such as an apparatus, a system, a device, a method, a means for performing acts, or a device readable medium including instructions that, when performed by the device, may cause the device to perform acts), such as may include or use a method for maintaining a boiling rate of a base fluid. The method may include determining a fluid level of a turbulated base fluid in a reservoir. The fluid level may be determined by measuring at least one first height of the turbulated base fluid above the fluid level with at least a first sensor. The fluid level may be determined by measuring at least one second height of the turbulated base fluid below the fluid level with the first sensor. The method may include establishing the fluid level of the turbulated base fluid according to the measured at least one first and second heights. The method may include graduating the introduction of an input fluid into the reservoir with a control valve in proportion to the established fluid level of the turbulated base fluid.

Aspect 2 may include or use, or may optionally be combined with the subject matter of Aspect 1, to optionally include or use that the control valve may include a valve opening configured to regulate flow between flow rates including no flow, full flow and one or more flow rates therebetween. The method may include that graduating the introduction of the input fluid into the reservoir includes automatically controlling the valve opening between the flow rates according to the established fluid level of the turbulated base fluid.

Aspect 3 may include or use, or may optionally be combined with the subject matter of one or any combination of Aspects 1 or 2 to optionally include or use that the control valve may include a valve opening configured to regulate flow between flow rates including no flow, full flow and one or more moderate flow rates therebetween. The method may include that graduating the introduction of the input fluid into the reservoir includes dynamically operating the control valve at full flow for a specified amount of time, with the specified amount of time in proportion to the determined fluid level.

Aspect 4 may include or use, or may optionally be combined with the subject matter of one or any combination of Aspects 1 through 3 to optionally include or use that at least one of measuring the first height or the second height of the turbulated base fluid includes: sensing the turbulated base fluid is above the first sensor, sensing the turbulated base fluid is below the first sensor, and establishing one or more of the first height or the second height according to the sensed turbulated base fluid above and below the first sensor.

Aspect 5 may include or use, or may optionally be combined with the subject matter of Aspect 4 to optionally include or use that the method may include that measuring the first height or the second height of the turbulated base fluid includes: measuring a first time period the turbulated base fluid is above the first sensor during a sample period, measuring a second time period the turbulated base fluid is below the second sensor during the sample period, and establishing one or more of the first height or the second height according to the measured first and second time periods.

Aspect 6 may include or use, or may optionally be combined with the subject matter of Aspect 5 to optionally include or use that the method may include that establishing one or more of the first height or the second height according to the measured first and second time periods includes establishing one or more of the first height or the second height according to a proportion of the measured first time period to the second time period.

Aspect 7 may include or use, or may optionally be combined with the subject matter of one or any combination of Aspects 1 through 6 to optionally include or use that the first sensor is included in a sensor array. The method may include that measuring the first height and the second height of the turbulated base fluid includes: sensing the turbulated base fluid is above the first sensor of a sensor array, sensing the turbulated base fluid is between the first sensor and a second sensor of the sensor array, and sensing the turbulated base fluid is below the second sensor.

Aspect 8 may include or use, or may optionally be combined with the subject matter of Aspect 7 to optionally include or use that the method may include that establishing the fluid level includes establishing the fluid level according to the sensed turbulated base fluid above, between and below the first and second sensors, respectively.

Aspect 9 may include or use, or may optionally be combined with the subject matter of one or any combination of Aspects 7 or 8 to optionally include or use that the method may include that measuring the first height and second height of the turbulated base fluid includes: measuring a first time period the turbulated base fluid is above the first sensor during a sample period, measuring a second time period the turbulated base fluid is between the first and second sensors during the sample period, and measuring a third time period the turbulated base fluid is below the second sensor during the sample period.

Aspect 10 may include or use, or may optionally be combined with the subject matter of Aspect 9 to optionally include or use that method may include that establishing the fluid level includes establishing the fluid level according to the measured first, second and third time periods.

Aspect 11 may include or use, or may optionally be combined with the subject matter of one or any combination of Aspects 1 through 10 to optionally include or use that the method may include repeating establishing the fluid level of the turbulated base fluid on an ongoing basis.

Aspect 12 may include or use, or may optionally be combined with the subject matter of Aspect 11 to optionally include or use that the method may include that graduating the introduction of the input fluid includes proportionally opening the control valve according to the repeated establishing of the fluid level.

Aspect 13 may include or use, or may optionally be combined with the subject matter of one or any combination of Aspects 1 through 12 to optionally include or use that the method may include turbulating the base fluid.

Aspect 14 may include or use, or may optionally be combined with the subject matter of one or any combination of Aspects 13 through 13 to optionally include or use that the method may include that turbulating the base fluid includes bringing the base fluid to a boil.

Aspect 15 may include or use, or may optionally be combined with the subject matter of one or any combination of Aspects 13 through 14 to optionally include or use that the method may include that turbulating the base fluid includes mechanically turbulating the base fluid.

Aspect 16 may include or use subject matter (such as an apparatus, a system, a device, a method, a means for performing acts, or a device readable medium including instructions that, when performed by the device, may cause the device to perform acts), such as may include or use a fluid level measuring apparatus. The apparatus may include a fluid level sensor array having one or more fluid level sensors, wherein the one or more fluid level sensors are configured to detect a turbulated base fluid at one or more heights in a reservoir. The apparatus may include a makeup controller in communication with the fluid level sensor array. The makeup controller may include a sampling module configured to receive one or more heights of the turbulated base fluid from the fluid level sensor array. The makeup controller may include a fluid level identification module configured to determine a turbulated fluid surface parameter, based on the received one or more heights of the turbulated base fluid, the turbulated fluid surface parameter corresponding to the quantity of the base fluid contained in the reservoir.

Aspect 17 may include or use, or may optionally be combined with the subject matter of Aspect 16, to optionally include or use that the one or more fluid level sensors includes electrical characteristic instruments.

Aspect 18 may include or use, or may optionally be combined with the subject matter of one or any combination of Aspects 16 or 17 to optionally include or use that the one or more fluid level sensors includes a float switch.

Aspect 19 may include or use, or may optionally be combined with the subject matter of one or any combination of Aspects 16 through 18 to optionally include or use a control valve having a valve opening. The control valve may be in communication with the makeup controller. The valve is configured to control a flow rate of an input fluid through the valve. The makeup controller is configured to control the flow rate proportionally to the turbulated fluid surface parameter.

Aspect 20 may include or use, or may optionally be combined with the subject matter of one or any combination of Aspects 16 through 19 to optionally include or use that the reservoir is a water tank for a humidifier.

Aspect 21 may include or use subject matter (such as an apparatus, a system, a device, a method, a means for performing acts, or a device readable medium including instructions that, when performed by the device, may cause the device to perform acts), such as may include or use a system for producing vapor. The system may include a reservoir for containing a turbulated base fluid. The system may include a fluid level sensor array, coupled to the reservoir, and having one or more fluid level sensors, wherein the one or more fluid level sensors detect the presence of the base fluid in the reservoir. The system may include a makeup controller in communication with the fluid level sensor array. The makeup controller may include a sampling module configured to receive one or more heights of the turbulated base fluid from the fluid level sensor array. The makeup controller may include a fluid level identification module configured to determine a turbulated fluid surface parameter, based on the received one or more heights of the fluid level, the turbulated fluid surface parameter corresponding to the amount of the base fluid contained in the reservoir.

The system may include a control valve coupled to the reservoir for the metered introduction of an input fluid into the reservoir. The control valve may be in communication with the makeup controller. The control valve has a valve opening, wherein the valve opening is configured to be opened and closed. The control valve is configured to control a flow rate of an input fluid through the valve by gradually opening and closing the valve opening. The makeup controller is configured to control the flow rate of the input fluid through the control valve and the controlling of the flow rate is proportional to the turbulated fluid surface parameter.

Aspect 22 may include or use, or may optionally be combined with the subject matter of Aspect 21, to optionally include or use that the one or more fluid level sensors includes electrical characteristic instruments.

Aspect 23 may include or use, or may optionally be combined with the subject matter of one or any combination of Aspects 21 or 22 to optionally include or use that the reservoir is a water tank for a humidifier.

Aspect 24 may include or use, or may optionally be combined with the subject matter of one or any combination of Aspects 21 through 23 to optionally include or use that the base fluid is water.

Each of these non-limiting examples can stand on its own, or can be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular". "round", or "square", are not intended to require absolute mathematical precision, unless the context indicates otherwise. Instead, such geometric terms allow for variations due to manufacturing or equivalent functions. For example, if an element is described as "round" or "generally round." a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods.

The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for maintaining a boiling rate of a base fluid, comprising:
    determining a fluid level of a turbulated base fluid in a reservoir, wherein the fluid level is determined by:
        measuring at least one first height of the turbulated base fluid above the fluid level with at least a first sensor while the base fluid is turbulated; and
        measuring at least one second height of the turbulated base fluid below the fluid level with the first sensor while the base fluid is turbulated;
        establishing the fluid level of the turbulated base fluid according to the measured at least one first and second heights; and
    graduating the introduction of an input fluid into the reservoir with a control valve in proportion to the established fluid level of the turbulated base fluid.

2. The method of claim 1, wherein the control valve includes a valve opening configured to regulate flow between flow rates including no flow, full flow and one or more flow rates therebetween, and graduating the introduction of the input fluid into the reservoir includes automatically controlling the valve opening between the flow rates according to the established fluid level of the turbulated base fluid.

3. The method of claim 1, wherein the control valve includes a valve opening configured to regulate flow between flow rates including no flow, full flow and one or more moderate flow rates therebetween, and graduating the introduction of the input fluid into the reservoir includes dynamically operating the control valve at full flow for a specified amount of time, with the specified amount of time in proportion to the determined fluid level.

4. The method of claim 1, wherein at least one of measuring the first height or the second height of the turbulated base fluid includes:
    sensing the turbulated base fluid is above the first sensor;
    sensing the turbulated base fluid is below the first sensor; and
    establishing one or more of the first height or the second height according to the sensed turbulated base fluid above and below the first sensor.

5. The method of claim 4, wherein measuring the first height or the second height of the turbulated base fluid includes:
    measuring a first time period the turbulated base fluid is above the first sensor during a sample period,
    measuring a second time period the turbulated base fluid is below a second sensor during the sample period, and
    establishing one or more of the first height or the second height according to the measured first and second time periods.

6. The method of claim 5, wherein establishing one or more of the first height or the second height according to the measured first and second time periods includes establishing one or more of the first height or the second height according to a proportion of the measured first time period to the second time period.

7. The method of claim 1, wherein the first sensor is included in a sensor array, and measuring the first height and the second height of the turbulated base fluid includes:
    sensing the turbulated base fluid is above the first sensor of a sensor array;
    sensing the turbulated base fluid is between the first sensor and a second sensor of the sensor array; and
    sensing the turbulated base fluid is below the second sensor.

8. The method of claim 7, wherein establishing the fluid level includes establishing the fluid level according to the sensed turbulated base fluid above, between and below the first and second sensors, respectively.

9. The method of claim 7, wherein measuring the first height and second height of the turbulated base fluid includes:
    measuring a first time period the turbulated fluid is above the first sensor during a sample period;
    measuring a second time period the turbulated base fluid is between the first and second sensors during the sample period; and
    measuring a third time period the turbulated base fluid is below the second sensor during the sample period.

10. The method of claim 9, wherein establishing the fluid level includes establishing the fluid level according to the measured first, second and third time periods.

11. The method of claim 1, further comprising repeating establishing the fluid level of the turbulated base fluid on an ongoing basis.

12. The method of claim 11, wherein graduating the introduction of the input fluid includes proportionally opening the control valve according to the repeated establishing of the fluid level.

13. The method of claim 1, further comprising turbulating the base fluid.

14. The method of claim 13, wherein turbulating the base fluid includes bringing the base fluid to a boil.

15. The method of claim 13, wherein turbulating the base fluid includes mechanically turbulating the base fluid.

16. A fluid level measuring apparatus comprising:
   a fluid level sensor array having one or more fluid level sensors, wherein the one or more fluid level sensors are configured to detect a turbulated base fluid at one or more heights in a reservoir while the fluid is turbulated with one or more of a heat source, heater, heat exchanger, or mechanical device configured to turbulate the base fluid; and
   a makeup controller in communication with the fluid level sensor array, wherein, the makeup controller includes:
      a sampling module configured to receive one or more heights of the turbulated base fluid from the fluid level sensor array; and
      a fluid level identification module configured to determine a turbulated fluid surface parameter, based on the received one or more heights of the turbulated base fluid, the turbulated fluid surface parameter corresponding to the quantity of the base fluid contained in the reservoir.

17. The apparatus of claim 16, wherein the one or more fluid level sensors includes electrical characteristic instruments.

18. The apparatus of claim 16, wherein the one or more fluid level sensors includes a float switch.

19. The apparatus of claim 16, comprising a control valve having a valve opening; the control valve in communication with the makeup controller, wherein:
   the valve is configured to control a flow rate of an input fluid through the valve; and
   the makeup controller is configured to control the flow rate proportionally to the turbulated fluid surface parameter.

20. The apparatus of claim 16, wherein the reservoir is a water tank for a humidifier.

21. A system for producing vapor, comprising:
   a reservoir for containing a turbulated base fluid;
   one or more of a heat source, heater, heat exchanger, or mechanical device configured to turbulate the base fluid;
   a fluid level sensor array, coupled to the reservoir, and having one or more fluid level sensors, wherein the one or more fluid level sensors detect the presence of the base fluid in the reservoir;
   a makeup controller in communication with the fluid level sensor array, wherein, the makeup controller includes:
      a sampling module configured to receive one or more heights of the turbulated base fluid from the fluid level sensor array while the fluid is turbulated; and
      a fluid level identification module configured to determine a turbulated fluid surface parameter, based on the received one or more heights of the fluid level, the turbulated fluid surface parameter corresponding to the amount of the base fluid contained in the reservoir; and
   a control valve coupled to the reservoir for the metered introduction of an input fluid into the reservoir, wherein:
      the control valve is in communication with the makeup controller;
      the control valve has a valve opening, wherein the valve opening is configured to be opened and closed;
      the control valve is configured to control a flow rate of an input fluid through the valve by gradually opening and closing the valve opening; and
      the makeup controller is configured to control the flow rate of the input fluid through the control valve and the controlling of the flow rate is proportional to the turbulated fluid surface parameter.

22. The apparatus of claim 21, wherein the one or more fluid sensors includes electrical characteristic instruments.

23. The apparatus of claim 21, wherein the reservoir is a water tank for a humidifier.

24. The apparatus of claim 21, wherein the base fluid is water.

* * * * *